(12) United States Patent
Wang et al.

(10) Patent No.: US 11,308,362 B2
(45) Date of Patent: Apr. 19, 2022

(54) METHOD AND SYSTEM FOR GENERATING A CENTERLINE FOR AN OBJECT, AND COMPUTER READABLE MEDIUM

(71) Applicant: SHENZHEN KEYA MEDICAL TECHNOLOGY CORPORATION, Shenzhen (CN)

(72) Inventors: Xin Wang, Seattle, WA (US); Youbing Yin, Kenmore, WA (US); Qi Song, Seattle, WA (US); Junjie Bai, Seattle, WA (US); Yi Lu, Seattle, WA (US); Yi Wu, Seattle, WA (US); Feng Gao, Seattle, WA (US); Kunlin Cao, Kenmore, WA (US)

(73) Assignee: SHENZHEN KEYA MEDICAL TECHNOLOGY CORPORATION, Shenzhen (CN)

( * ) Notice: Subject to any disclaimer, the term of this patent is extended or adjusted under 35 U.S.C. 154(b) by 0 days.

(21) Appl. No.: 16/827,613

(22) Filed: Mar. 23, 2020

(65) Prior Publication Data
US 2020/0311485 A1 Oct. 1, 2020

Related U.S. Application Data

(60) Provisional application No. 62/824,240, filed on Mar. 26, 2019.

(51) Int. Cl.
*G06T 15/00* (2011.01)
*G06K 9/62* (2022.01)
(Continued)

(52) U.S. Cl.
CPC ............ *G06K 9/6262* (2013.01); *G06N 3/08* (2013.01); *G06T 19/00* (2013.01); *G06V 10/42* (2022.01)

(58) Field of Classification Search
CPC .... G06K 9/6262; G06K 9/52; G06K 2209/05; G06T 2207/20021; G06T 2207/20081;
(Continued)

(56) References Cited

U.S. PATENT DOCUMENTS 8,494,240 B2 * 7/2013 Milstein ................. G06T 7/181
382/128
9,730,643 B2 * 8/2017 Georgescu ............. G16H 50/30
(Continued)

OTHER PUBLICATIONS

Zhang P, Wang F, Zheng Y. Deep reinforcement learning for vessel centerline tracing in multi-modality 3D volumes. InInternational Conference on Medical Image Computing and Computer-Assisted Intervention Sep. 16, 2018 (pp. 755-763). Springer, Cham.*
(Continued)

*Primary Examiner* — Phu K Nguyen
(74) *Attorney, Agent, or Firm* — Bayes PLLC

(57) ABSTRACT

Methods and Systems for generating a centerline for an object in an image and computer readable medium are provided. The method includes receiving an image containing the object. The method also includes generating the centerline of the object by tracing a sequence of patches with a virtual agent. For each patch other than the initial patch, the method determines a current patch based on the position and action of the virtual agent at a previous patch. The method further determines a policy function and a value function based on the current patch using a trained learning network, which includes an encoder followed by a first learning network and a second learning network. The learning network is trained by maximizing a cumulative reward. The method also determines the action of the virtual agent at the current patch. Additionally, the method displays the centerline of the object.

20 Claims, 7 Drawing Sheets

(51) Int. Cl.
*G06N 3/08* (2006.01)
*G06T 19/00* (2011.01)
*G06V 10/42* (2022.01)

(58) Field of Classification Search
CPC . G06T 7/187; G06T 7/11; G06T 2207/30048; G06T 2207/10072; G06T 2207/20084; G06T 2207/30172; G06T 19/00; G06T 2207/30101; G06T 7/143; G06N 3/08
USPC .......................................................... 345/418
See application file for complete search history.

(56) References Cited

U.S. PATENT DOCUMENTS

| | | | | |
|---|---|---|---|---|
| 10,206,646 | B2* | 2/2019 | Gulsun | G06K 9/4623 |
| 10,441,235 | B2* | 10/2019 | Lavi | G06T 7/149 |
| 10,671,076 | B1* | 6/2020 | Kobilarov | G05D 1/0255 |
| 10,685,438 | B2* | 6/2020 | Reda | G01B 21/20 |
| 10,945,606 | B2* | 3/2021 | Sanders | G16H 50/50 |
| 10,955,853 | B2* | 3/2021 | Luo | G05D 1/0214 |
| 2014/0348408 | A1* | 11/2014 | Zhu | A61B 6/032 382/132 |
| 2016/0174902 | A1* | 6/2016 | Georgescu | G06T 7/0012 600/408 |
| 2019/0325579 | A1* | 10/2019 | Wang | G06T 7/174 |
| 2019/0355120 | A1* | 11/2019 | Wang | G06N 20/00 |
| 2019/0362855 | A1* | 11/2019 | Ma | A61B 6/5217 |
| 2020/0311485 | A1* | 10/2020 | Wang | G06K 9/6262 |
| 2021/0082580 | A1* | 3/2021 | Ma | A61B 8/5223 |
| 2021/0085397 | A1* | 3/2021 | Passerini | A61B 5/7278 |

OTHER PUBLICATIONS

Sironi A, Türetken E, Lepetit V, Fua P. Multiscale centerline detection. IEEE Transactions on Pattern Analysis and Machine Intelligence. Jul. 29, 2015;38(7):1327-41.*

Franz A, Lorenz C. Deep Learning Based Rib Centerline Extraction and Labeling. InComputational Methods and Clinical Applications in Musculoskeletal Imaging: 6th International Workshop, MSKI 2018, Held in Conjunction with MICCAI 2018, Granada, Spain, Sep. 16, 2018, Revised Selected Papers Jan. 8, 2019 (vol. 1140.*

Tetteh G, Efremov V, Forkert ND, Schneider M, Kirschke J, Weber B, Zimmer C, Piraud M, Menze BH. DeepVesselNet: Vessel Segmentation, Centerline Prediction, and Bifurcation Detection in 3-D Angiographic Volumes. arXiv e-prints. Mar. 2018:arXiv-1803.*

Nguyen LD, Gao R, Lin D, Lin Z. Biomedical image classification based on a feature concatenation and ensemble of deep CNNs. Journal of Ambient Intelligence and Humanized Computing. Mar. 19, 2019:1-3.*

Moritz et al, Cascaded-CNN: Deep Learning to Predict Protein Backbone Structure from High-Resolution Cryo-EM Density Maps, University of Washington, Mar. 12, 2019.*

* cited by examiner

METHOD AND SYSTEM FOR GENERATING A CENTERLINE FOR AN OBJECT, AND COMPUTER READABLE MEDIUM

CROSS-REFERENCE TO RELATED APPLICATION

This application claims the benefit of priority to U.S. Provisional Application No. 62/824,240, filed on Mar. 26, 2019, the entire contents of which are incorporated herein by reference.

TECHNICAL FIELD

The disclosure generally relates to medical image processing and analysis. More specifically, this disclosure relates to a method and system for generating a centerline for an object, for example, a vessel, an airway, breast ducts, or the like, in an image.

BACKGROUND

Various biomedical image applications involve complex objects in tree structures, such as vessels and airways. Objects in tree structures are commonly observed in the human body, including airways, blood vessels (for example, arteries, veins, and capillaries), nervous structures, and breast ducts extending from the nipple. Recent technological advances in medical imaging (CT, MRI, fundus camera imaging, or the like) make it possible to acquire the medical images (2D, 3D or 4D) including the structures mentioned above.

Centerline is a skeleton (or medial axis) representation of a shape such that each point on it is equidistant to the shape's boundaries. Centerline provides a concise representation that emphasizes geometrical and topological properties of the object such as connectivity, length, direction, or the like. For example, in clinical practice, centerline extraction is a perquisite for quantitative measurements of the tree structures, including lengths, radius, angles, or the like. Current centerline tracing approaches could be classified in two major categories: morphological skeletonization and minimum cost path-based methods. For morphological skeletonization methods such as erosion and thinning, a segmentation mask is usually used and small perturbations or noise on the image/mask can easily lead to spurious branches. In contrast, the minimum-path-based methods build a cost image and compute an optimal path from the starting point to the ending point. The cost image is usually calculated based on the image intensity or derived metrics. In addition, in order to ensure extracted centerlines stay inside the lumen, such a minimum path approach may apply to segmentation mask itself and the cost image is calculated based on distance transform. Even though the minimal-path-based algorithms are typically more robust than the morphological tracing algorithm, it still has severe limitations. On one hand the starting and ending points are manually specified, which increases user interactions, or detected using prior information, which may result in missing points or detecting unnecessary points. On the other hand, the cost image calculated based on intensity or intensity-derived metrics may not work well if the image intensity and quality vary significantly. Besides, calculating the cost image requires extra steps for mask extraction, which is a very challenge task.

Due to the lack of robustness of the convention approaches above, clinicians or technicians usually trace the centerline manually or with some semi-automatic tools, which are labor-intensive and time-consuming, and the results may be error-prone.

The conventional methods suffer from drawbacks. For example, the intensity-based minimal-path-algorithms lack robustness, due to the large variance of the image intensity. For the segmentation-based centerline tracing algorithms, the segmentation steps have to be conducted throughout the whole scan. Usually, the size of the medical image is very large, thus the segmentation step itself is very time-consuming. The segmentation-based centerline tracing algorithms also need manually specifying or extracting start points or end points based on prior information. The segmentation-based centerline tracing algorithm is not an end-to-end model. Using post-processing to handle the smoothness of the centerline tracing, these algorithms typically rely on the output of the previous multi-steps models, hence the results are suboptimal for the image object. Also, in these algorithms, centerlines are extracted from one single path to another and it is not optimal to handle tree structures.

SUMMARY

The present disclosure is provided to overcome the drawbacks in the conventional method for extracting centerlines of object, with a variety of geometrical shapes and structures such as complex tree structure, in various images. The present disclosure is provided to achieve robust automated extraction for tree structure centerline in an end-to-end manner by introducing Deep Reinforcement Learning (DRL) algorithm.

In one aspect, a computer implemented method for generating a centerline for an object is disclosed. The method includes receiving an image containing the object. The image is acquired by an imaging device. The method also includes generating the centerline of the object by tracing a sequence of patches with a virtual agent by a processor. For each patch other than the initial patch, the processor determines a current patch based on the position and action of the virtual agent at a previous patch. The processor determines a policy function and a value function based on the current patch using a trained learning network, which includes an encoder followed by a first learning network and a second learning network. The processor also determines the action of the virtual agent at the current patch. The learning network may be trained by maximizing a cumulative reward. The method can also include displaying the centerline of the object generated by the processor.

In another aspect, a system for generating a centerline for an object is disclosed. The system includes an interface configured to receive an image containing the object. The image is acquired by an imaging device. The system further includes a processor configured to generate the centerline of the object by tracing a sequence of patches with a virtual agent. For each patch other than the initial patch, the processor determines a current patch based on the position and action of the virtual agent at a previous patch. The processor determines a policy function and a value function based on the current patch using a trained learning network, which includes an encoder followed by a first learning network and a second learning network. The processor determines the action of the virtual agent at the current patch. The learning network may be trained by maximizing a cumulative reward. The system also includes a display configured to display the centerline of the object.

In a further aspect, a non-transitory computer readable medium storing instructions is disclosed. The instructions, when executed by a processor, perform a method for generating a centerline for an object. The method includes receiving an image containing the object, wherein the image is acquired by an imaging device. The method further includes generating the centerline of the object by tracing a sequence of patches with a virtual agent by the processor. The method further includes, for each patch other than the initial patch, determining a current patch based on the position and action of the virtual agent at a previous patch. The method also includes determining a policy function and a value function based on the current patch using a trained learning network, which includes an encoder followed by a first learning network and a second learning network. The method further includes determining the action of the virtual agent at the current patch. The learning network may be trained by maximizing a cumulative reward. The method additionally includes outputting the centerline of the object for display.

To handle the tree-structured centerline tracing in the biomedical images, the reinforcement learning procedure may be improved by augmenting the loss function with auxiliary tasks that provide more training information that supports tracing-relevant tasks learning. Three additional auxiliary tasks may be included, namely, bifurcation detection, endpoint detection, and loop detection. Bifurcation detection task involves recognition of a bifurcation. This auxiliary task is aimed to improve the trajectory planning at the bifurcation and keep tracing along all the bifurcation branches. Endpoint detection task directly detects the endpoints of the tree. The network is trained to predict if the current location is an endpoint in order to stop the tracing. Loop detection task directly detects loop closure from tracing trajectory. The network is trained to predict if the current location has been previously visited. The trained learning network predicts the movement of an virtual agent that intelligently traces the centerline in the image.

The advantages of the method, system, and medium for generating a centerline for an object in an image of the present disclosure can be summarized as below. The model is an end-to-end deep network (with an image as its input), which may trace a sequence of patches by determining the moving action of individual patch using both policy function and value function updated for the corresponding patch, so as to generate the centerline of the object accurately and quickly in a robust manner. Besides, in some embodiments, the reinforcement learning procedure of the model may be improved by introducing auxiliary outputting layers and corresponding auxiliary tasks to provide more training information and thus train the model using various structural and topological characteristics. In this manner, the trained model may jointly learn the goal-driven reinforcement learning problem and better solve the centerline tracing problem in tree structures. Moreover, the method of the present invention is capable of avoiding scanning the whole image in both training and prediction stages.

It is to be understood that the foregoing general description and the following detailed description are exemplary and explanatory only, and are not restrictive of the invention, as claimed.

BRIEF DESCRIPTION OF THE DRAWINGS

In the drawings, which are not necessarily drawn to scale, like reference numerals may describe similar components in different views. Like reference numerals having letter suffixes or different letter suffixes may represent different instances of similar components. The drawings illustrate generally, by way of example, but not by way of limitation, various embodiments, and together with the description and claims, serve to explain the disclosed embodiments. Such embodiments are demonstrative and not intended to be exhaustive or exclusive embodiments of the present method, system, or non-transitory computer readable medium having instructions thereon for implementing the method.

DETAILED DESCRIPTION

Hereinafter, the technical term "object" is used in contrast to the background of the image. For medical images, "object" may refer to organs and tissues of interest, for example, vessel, airway, glands. For optical character recognition, "object" may refer to characters. In some embodiments, medical image is used as an example of image and vessel is used as an example of the "object", but the method, device, and system in the embodiments may be adapted to extraction of centerlines for other objects in other types of images. The technical term "image" may refer to a complete image or an image patch cropped from the image.

Figures 1A, 1B:
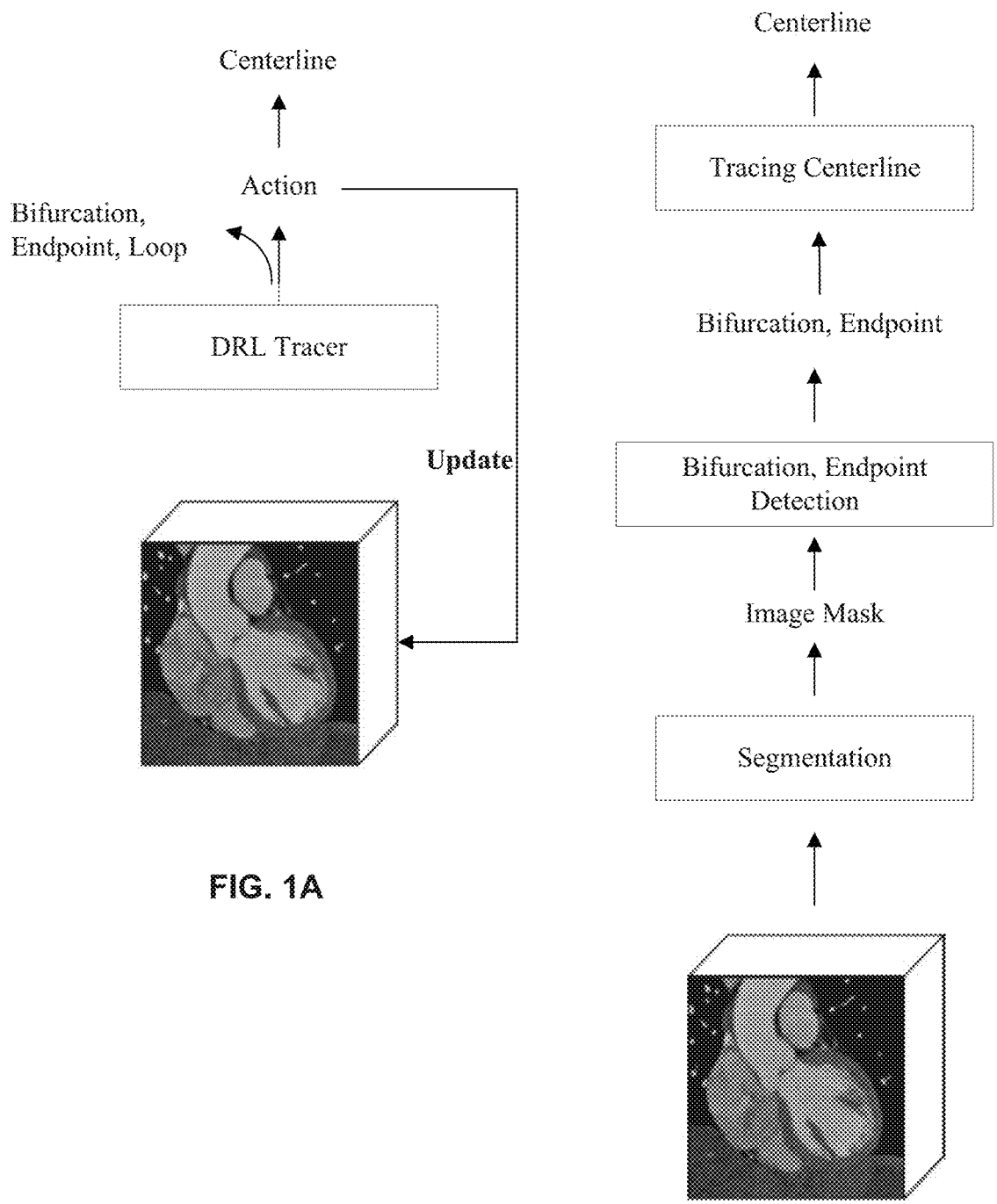
FIG. 1A illustrates an overview of a method for generating a centerline for an object in an image according to an embodiment of the present disclosure.
FIG. 1B illustrates an overview of a conventional segmentation-based method.

FIG. 1A and FIG. 1B illustrate an overview of a method for generating a centerline for an object in an image according to an embodiment of the present disclosure and a conventional segmentation-based method, for comparing these two kinds of approaches. The method for generating a centerline for an object in an image according to an embodiment of the present disclosure can be implemented using an end-to-end learning framework, such as a DRL end-to-end approach, which incorporates multiple tasks (detection of bifurcation, endpoint, loop, or the like) into the main task of tracing the centerline for the object, for example, blood vessel. By contrast, the traditional segmentation-based approach as shown in FIG. 1B has to segment the image first. For the segmentation-based centerline tracing algorithms, the segmentation step has to be conducted firstly throughout the whole scan. Usually, the size of the medical image is very large, thus the segmentation step itself is very time-consuming. For the segmentation based centerline tracing algorithms, start points or end points need to be manually specified or extracted based on prior information. As shown in FIG. 1B, the auxiliary detection result of the bifurcation, end point, or the like, may be incorporated to the image mask obtained by segmentation, so as to assist the tracing of the centerline.

As shown in FIG. 1A, the end-to-end learning framework of the present disclosure may work as follows. The image may be fed into a DRL Tracer. The initial patch may be set in advance. As an example, a patch containing part of the object instead of the background may be set as the initial patch. In some embodiments, a different patch, even one containing background, may be used as the initial patch. In this manner, manual interactions may be reduced or even eliminated, which may substantially reduce the workload of the clinicians and technicians.

The DRL Tracer may be applied to an individual patch for each tracing step, and may decide the action of the current patch. The DRL Tracer may be partially implemented by a learning network, which may be trained by taking into account the performance of auxiliary tasks, such as detection of bifurcation, endpoint, and loop. The next patch may then be traced and updated by performing the decided action from the position of the current patch. The traced and updated patch can then become the current patch. Such steps may be repeated for each current patch, so as to generate the centerline by connecting the traced patches sequentially.

In some embodiments, the DRL tracer as shown in FIG. 1A may be implemented as an Asynchronous Advantage Actor-Critic (A3C) architecture.

The A3C architecture predicts the movement of an agent that is generally trained to complete tasks of tracing the centerline for the object included in an image, which may be a 2D image or a 3D image. DRL tracer as illustrated in FIG. 1A acts as the agent. The agent may take actions (i.e., move) in various directions, including left, right, top, bottom, front, back, and their combinations. At time t, after deciding to take action $a_t$, the agent moves to the next position based on the selected action from the position of the current patch. The patch located at the next position can then become the current patch. As for A3C architecture, Actor corresponds to policy function (regulating how to make action, such as distribution of probability over actions), and Critic corresponds to value function (regulating how to evaluate the performance of the action). As for the training phase, the cumulative reward may be calculated using an advantage function, depending on which the learning network may be trained and thus the policy function and value function may be learned and updated.

Figure 2:
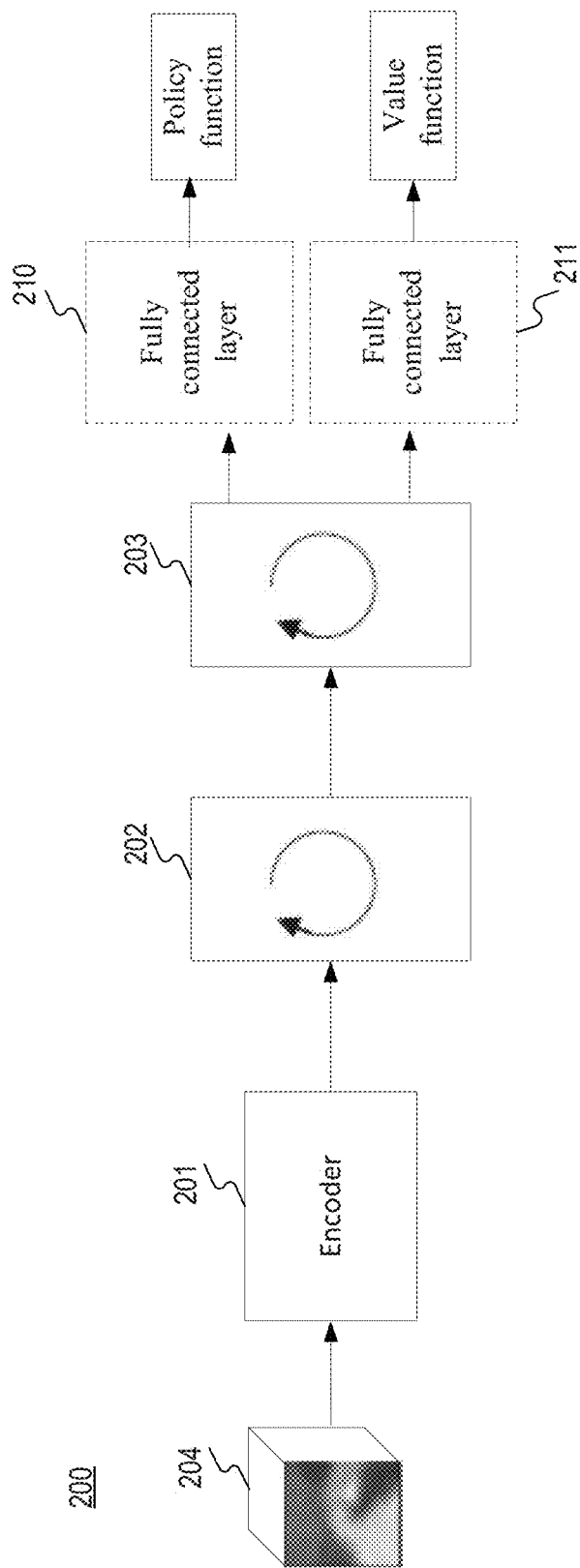
FIG. 2 illustrates an architecture of a Deep Reinforcement Learning (DRL) network for generating a centerline for an object according to an embodiment of the present disclosure.

FIG. 2 illustrates an example of the structure of a DRL network 200 for generating a centerline for an object according to an embodiment of the present disclosure, especially on how to trace the next patch (expected to belong to the centerline) from the current patch 204 for an individual tracing step. As explained above, the operation for the individual tracing step as shown in FIG. 2 may be iteratively performed until a maximum episode length is reached, and the centerline may be generated based on the traced sequence of patches.

As shown in FIG. 2, the architecture of the DRL network 200 includes an encoder 201 that receives an image containing the object. As an example, the encoder 201 can be any Convolutional Neural Network (CNN) architecture. The image can be acquired by an imaging device by an imaging device. The image may be a 2D image, 3D image, or a 4D image. The image may be acquired directly by a various of imaging modalities, such as but not limited to CT, digital subtraction angiography (DSA), MRI, functional MRI, dynamic contrast enhanced-MRI, diffusion MRI, spiral CT, cone beam computed tomography (CBCT), positron emission tomography (PET), single-photon emission computed tomography (SPECT), X-ray imaging, optical imaging, fluorescence imaging, ultrasound imaging, radiotherapy portal imaging, or acquired by reconstruction based on the original images acquired by the image device. For example, a 3D vessel volume image may be obtained by reconstruction based on vessel DSA images at two different projection directions. The technical term "acquire" or its variants means any manner of obtaining, directly or indirectly, with or without additional image processing (noise reduction, cropping, reconstruction, or the like), and the acquired image is received as input image to the DRL network. Although not shown in FIG. 2, tracing the current patch 204 can include identifying and/or recording the presence and/or location of a centerline within the current patch 204, using any desired tool for identifying target features, such as anatomical features, in the current patch 204. These features may include, for example, a two-dimensional or three-dimensional vector or group of vectors corresponding to the centerline. For example, if a bifurcation is detected, as discussed below, multiple vectors may be used to represent the centerline in the current patch.

As illustrated in FIG. 2, the architecture of DRL network 200 according to the embodiment further includes a first learning network 202 and a second learning network 203 following the encoder 201. A policy function ($\pi$) and a value function (V), which are outputs of the DRL network 200, share all intermediate representations, both computed using a separate output layer (for example, linear layer) from the topmost of the model. In order to facilitate the illustration, fully connected layer is adopted as the output layer hereinafter, but the output layer also may adopt other designs.

In FIG. 2, as an example, a first fully connected layer 210 is cascaded to the end of the main portion of the second learning network 203' and outputs the policy function, and a second fully connected layer 211 is cascaded to the end of the main portion of the second learning network 203' and outputs the value function. Hereinafter, the main portion of the second learning network 203' together with the output layers, for example, the first fully connected layer 210 and the second fully connected layer 211, construct the second learning network 203.

The first and second fully connected layers 210, 211 include multiple nodes, each of which is connected to each node of the main portion of the second learning network 203'. The first and second learning networks 202, 203 are trained by maximizing cumulative reward, so as to learn the policy function and value function given a state observation ($s_t$). In some embodiments, the intensity of the patch obtained upon action performed by $(t-1)^{th}$ tracing step may be used as the state observation ($s_t$).

The first and second learning networks 202, 203 (or the main portion of the second learning network 203') may be either a Multi-Layer Perceptron (MLP) layer or a stacked Recurrent Neural Network (RNN) layer. A stacked RNN may be added into the network architecture, so as to account for the context information along centerline. Indeed, the RNN structures may take into account historical states when producing current decisions. Adding of the stacked RNN may reflect the space dependence among the points on a centerline, so as improve the tracing of the centerline.

Figure 3:
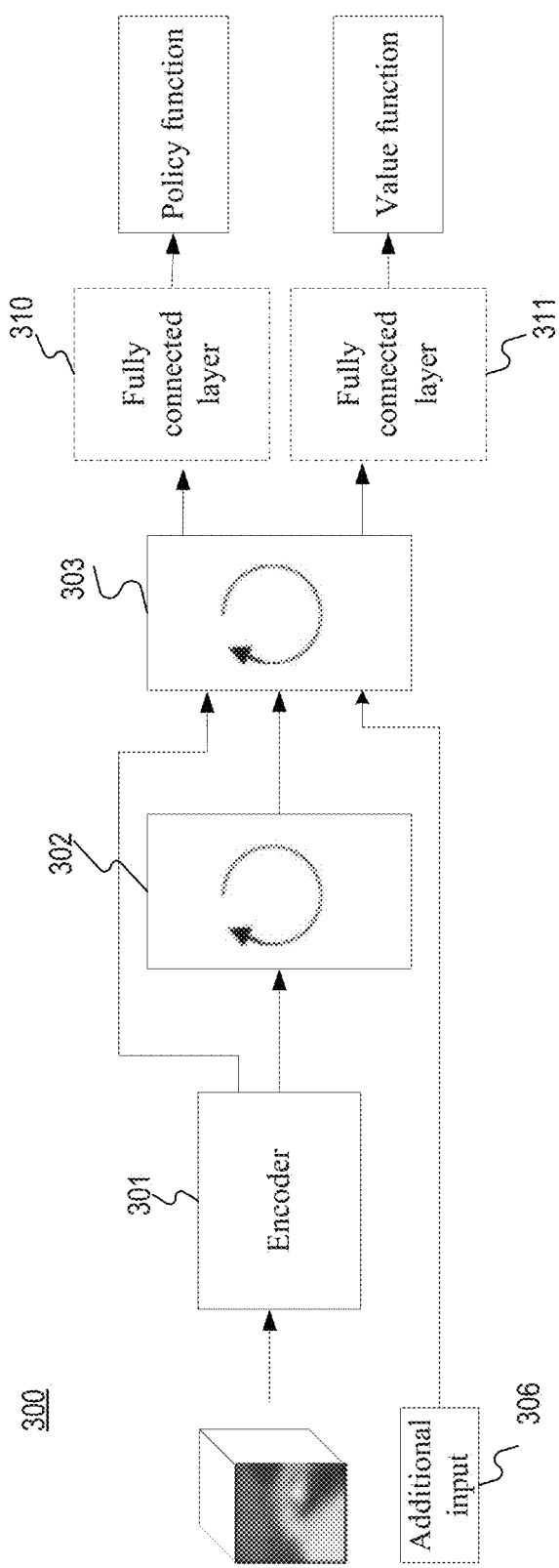
FIG. 3 illustrates an architecture of a DRL network for generating a centerline for an object according to another embodiment of the present disclosure.

FIG. 3 illustrates an architecture of a DRL network 300 for generating a centerline for an object according to another embodiment of the present disclosure. As illustrated in FIG. 3, the architecture of the DRL network 300 includes an encoder 301 that receives an image containing the object, followed by a first learning network 302 and a second learning network 303, a first fully connected layer 310 is cascaded to the main portion of the second learning network 303' and outputs the policy function as an output of the DRL network 300, and a second fully connected layer 311 is cascaded to the main portion of the second learning network 303' and outputs the value function as another output of the DRL network 300.

According to this embodiment, input of the second learning network 303 is a concatenated vector composed by an output from the encoder 301, an output from the first learning network 302 and an additional input. The architecture of the DRL network 300 of the present embodiment is similar to the embodiment of FIG. 2 in other aspects. The additional input can be a reward of $(t-1)^{th}$ step, $r_{t-1}$, action of $(t-1)^{th}$ step, $a_{t-1}$, tracing velocity in $t^{th}$ step, $v_t$, and/or the like, which will be described in detail below. Among them, a joint reward function, which includes a point-to-curve distance that is used to measure the effect of the transition from state to state, and the similarity of intensity such as average integral of intensities between the current location and next location of the agent, can be used as the reward function for the $(t-1)^{th}$ step. The point-to-curve distance can indicate the distance between the position of the current patch and the centerline of the object and may be minimized so as to maximize the reward of the current patch (or the current step). Any function for calculating the point-to-curve distance may be used. As an example, an average distance from sampled points in the patch to sampled points on the nearest centerline may be calculated as the point-to-curve distance to measure the distance between the patch and the centerline. The similarity of intensity between the current patch and the next patch of the image may be maximized so as to maximize the reward of the current patch. As an example, average integral of intensities between the current patch and the next patch of the image may be calculated. As the joint reward function is used for each patch, the topology of patches matches with the centerline of the object as closely as possible. Other additional inputs can be contemplated and used.

Figure 4:
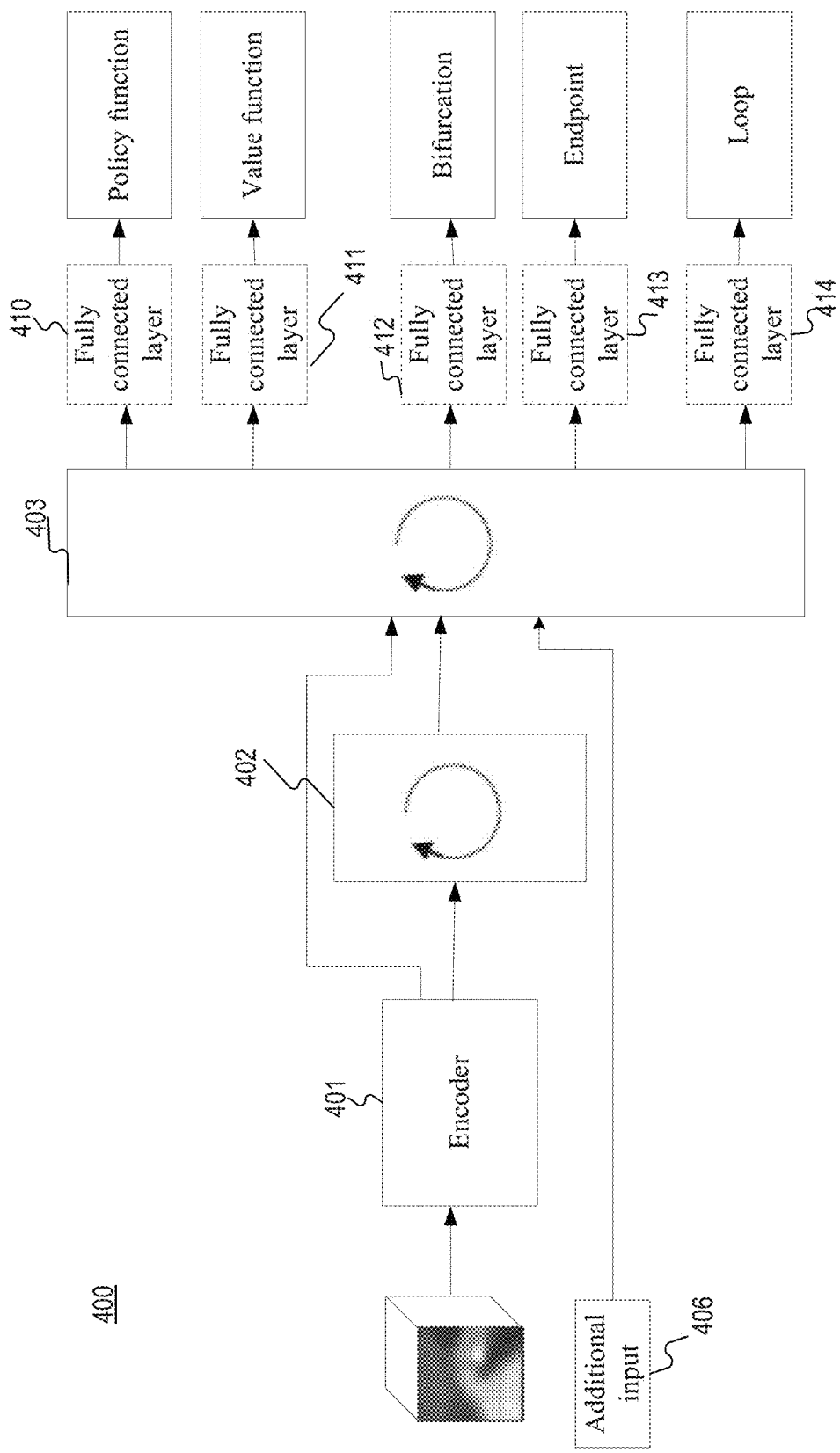
FIG. 4 illustrates an example architecture of a DRL network for generating a centerline for an object according to a further embodiment of the present disclosure.

FIG. 4 illustrates an architecture of a DRL network 400 for generating a centerline for an object according to a further embodiment of the present disclosure. The architecture as shown in FIG. 4 is different from that of FIG. 3 in that three additional auxiliary tasks are taken into account: Bifurcation detection, Endpoint detection, and loop detection. Bifurcation detection task involves recognition of a bifurcation. This auxiliary task is aimed to improve the trajectory planning at the bifurcation and keep tracing along all the bifurcation branches. Endpoint detection task directly detects the endpoints of the tree, and the network is trained to predict if the current location is an endpoint in order to stop the agent from tracing. Loop detection task directly detects loop closure from tracing trajectory, and the network is trained to determine if the agent has previously visited the current location. Fully connected layers 312, 313, 314 are cascaded to the main portion of the second learning network 403' and output detection results of bifurcation, endpoint and loop, respectively. As shown in FIG. 4, the second learning network 403 has 5 outputting layers, for example, fully connected layers 410, 411, 412, 413, and 414, for outputting the policy function, value function, bifurcation detection result, endpoint detection result, and loop detection result, respectively. The DRL network 400 may be trained using maximizing a cumulative reward meanwhile minimizing these auxiliary losses of detecting the bifurcation, endpoint, and loop closures.

Figure 5:
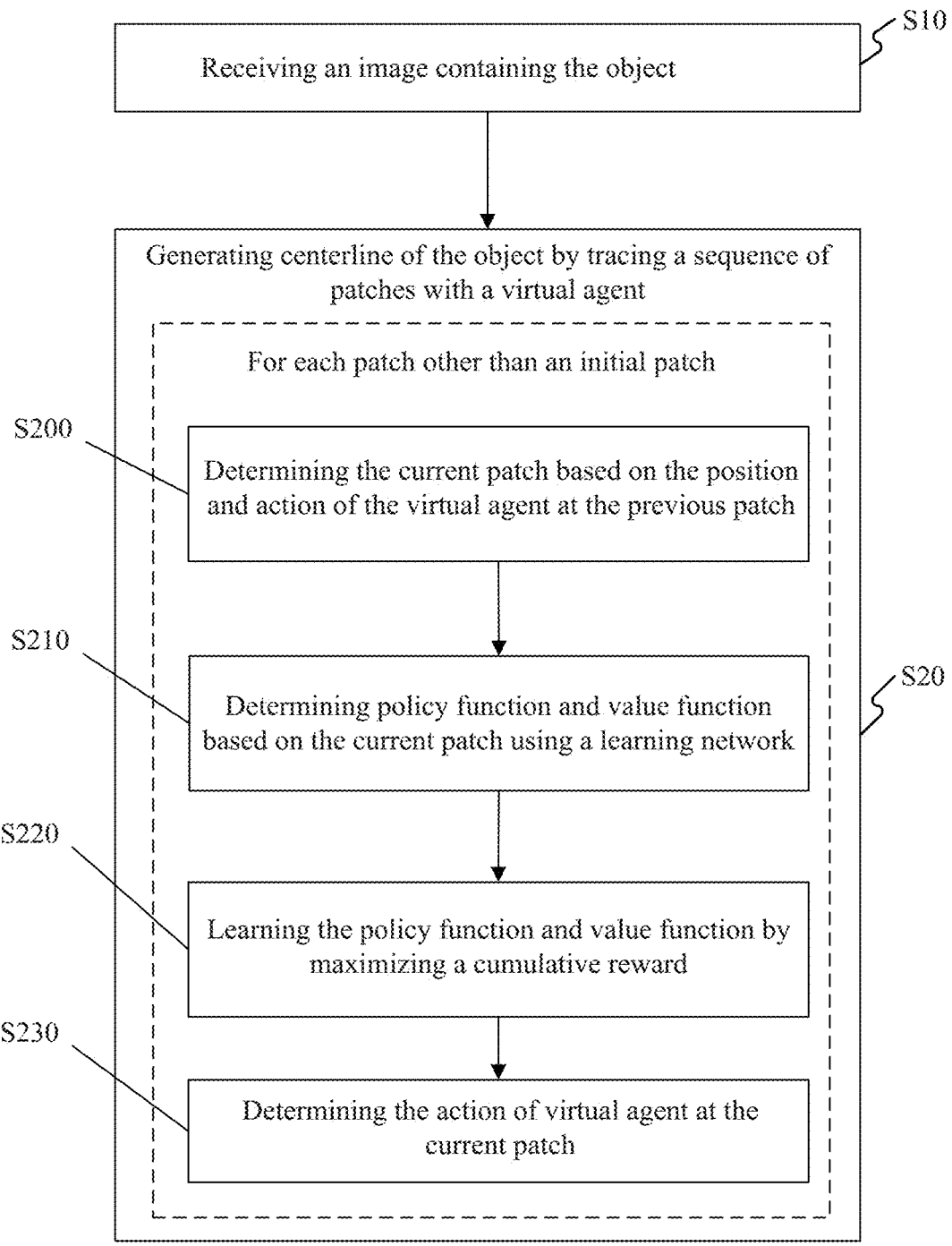
FIG. 5 illustrates a flowchart of an example method for generating a centerline for an object according to an embodiment of present disclosure.

A flowchart of process for generating a centerline for an object according to an embodiment of present disclosure is illustrated in FIG. 5. As illustrated in FIG. 5, the process of generating the centerline for an object begins with receiving an image containing the object at step S10, then proceeds to step S20, generating centerline of the object by tracing a sequence of patches. The step of generating centerline of the object by tracing a sequence of patches at step S20 includes, for each patch other than an initial patch, tracing the current patch based on the position and action of the previous patch at step S200, outputting a policy function and a value function based on the current patch using a learning network at step S210, learning the policy function and the value function by maximizing a cumulative reward at step S220, and determining the action of the current patch at step S230. In particular, the learning network includes an encoder followed by first and second learning networks. As an example, the learning/training step S220 may be performed offline or online. In some embodiment, during the prediction phase, step S220 may not be performed. Instead, the learning network may be trained offline, and thus at step S210, the policy function and value function may be determined based on the current patch using the already trained learning network. In some embodiments, for one episode, each patch (each step) may share the same learning network, the parameters of which have already been determined through training.

In some embodiments, outputting a policy function and a value function based on the current patch using a trained learning network comprises the following steps: determining a first vector by the encoder 201, 301, 401 based on the current patch, determining a second vector by the first learning network 202, 302, 402 based on the first vector, and outputting the policy function and the value function based on a vector obtained by concatenating the first vector, the second vector and additional inputs, which comprises at least the reward and action of the previous patch, using each of the second learning network 203, 303, 403.

In some embodiments, the additional input includes a reward and action of the previous patch and the tracing velocity of the current patch.

In some embodiments, the learning network may be trained by maximizing a cumulative reward (for example, within an episode) and minimizing auxiliary losses of detecting bifurcation, endpoint, and loop closures.

In some embodiments, the policy function and the value function and the detection result of the bifurcation, endpoint, and loop closures are output respectively from the individual fully-connected layers 410, 411, 412, 413, 414 cascaded to the preceding learning network, for example, the main portions of the second learning network 203', 303', 403' as shown in FIGS. 2-4.

In some embodiments, the reward of each patch may combine a point-to-curve distance and the similarity of intensity between the current patch and the next patch, and the point-to-curve distance indicates the distance between the position of the current patch and the centerline of the object. In this manner, the traced patches may be prohibited from departing away from the centerline. Besides, the texture (or intensity distribution) similarity of the patches located on the centerline may be taken into account, so as to further improve the tracing accuracy.

In some embodiments, the initial patch may be preset and selected. The step of tracing a sequence of patches ends with a terminal state or a maximum episode length being reached. Parameters of the agent performing the trace are represented by $\Theta$. Gradients of $\Theta$ are backpropagated from the actor-critic outputs to the lower-level layers. In this manner, the network may be trained in an end-to-end manner.

In some embodiments, the image is a 3D image, and the action space of the agent consists of six primary actions. As described above, the six primary actions include left, right, top, bottom, front and back. The traced centerline of the object may be presented to the user in a 3D mode.

According to some embodiments, the encoder may be a convolutional neural network, and both the first learning network and the second learning network may be RNN. The RNN network might be Long Short-Term Memory (LSTM), Gate Recurrent Unit (GRU), Convolutional Gate Recurrent Unit (CGRU) or Convolutional Long Short-Term Memory (CLSTM).

The DRL-based method according to various embodiments generally includes two phases, a training phase and a prediction phase, and learns the policy function and the value function using the interaction of the agent and the environment. Different from traditional supervised learning and unsupervised learning of other deep learning networks, reinforcement learning may take into account the ground truth indirectly, using the reward. As an example, the reward of each patch may combine a point-to-curve distance, which indicates the distance between the position of the current patch and the ground truth centerline of the object.

The training phase may be an offline process, during which a database of annotated training data with the ground truth is assembled. Given a 3D volumetric image and the list of ground truth vessel centerline points, a tracing model for predicting the movement of the agent is learned to trace the centerline through an optimal trajectory. The approaches such as Batch normalization, Entropy regularization Compatibility, or the like, could also be used to stabilize and improve training. The prediction phase may be an online process. With an unseen test sample, a starting point, for example at the vascular root, is provided to the system. The centerline tracing process stops if the agent moves out of the volume or if a cycle is formed by moving to a position already visited previously.

Figure 6:
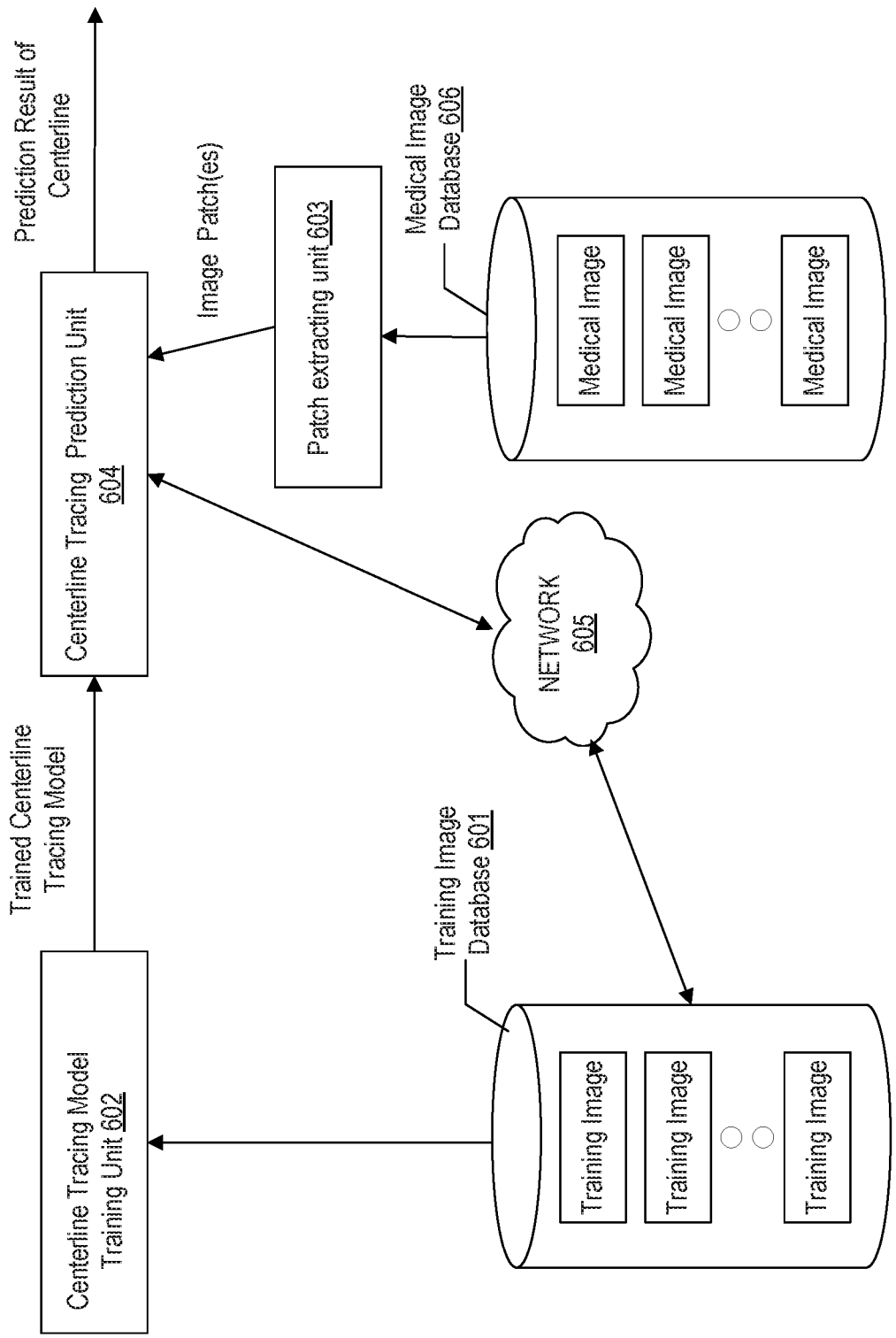
FIG. 6 illustrates a schematic diagram of training and prediction phases.

Next, the training and prediction phases for the centerline tracing and/or generation may be described in detail with reference to FIG. 6, which illustrates an outline of implementations of centerline tracing system 600 including training and prediction phases. As shown, the system 600 may include a centerline tracing model training unit 602 and a centerline tracing prediction unit 604. The centerline tracing model training unit 602 acquires training image as ground truth from a training image database 601 to train a centerline tracing model, and as a result, outputs the trained centerline tracing model to the centerline tracing prediction unit 604. The centerline tracing prediction unit 604 is communicatively coupled to a patch extracting unit 603, which can extract image patch(es) from medical image in a medical image database 606 and then predict centerline of the object by tracing a sequence of image patches, finally generating the centerline of the object as the prediction result. According to the embodiments of the disclosure, the policy function and the value function as described above can be learned by maximizing the cumulative reward during the training of the model. After iterated training by using training data, the trained centerline tracing model can be obtained, particularly, the parameters of the learning networks may be optimized. In some embodiments, the centerline tracing prediction unit 604 may be communicatively coupled to the training image database 601 via network 605. In this manner, the prediction result of centerline, especially the medical images marked with centerline, obtained by the centerline tracing prediction unit 604, upon confirmation by the radiologist or the clinician, may be fed back as training sample to the training image database 601. Thereby, the training image database 601 may be extended.

Figure 7:
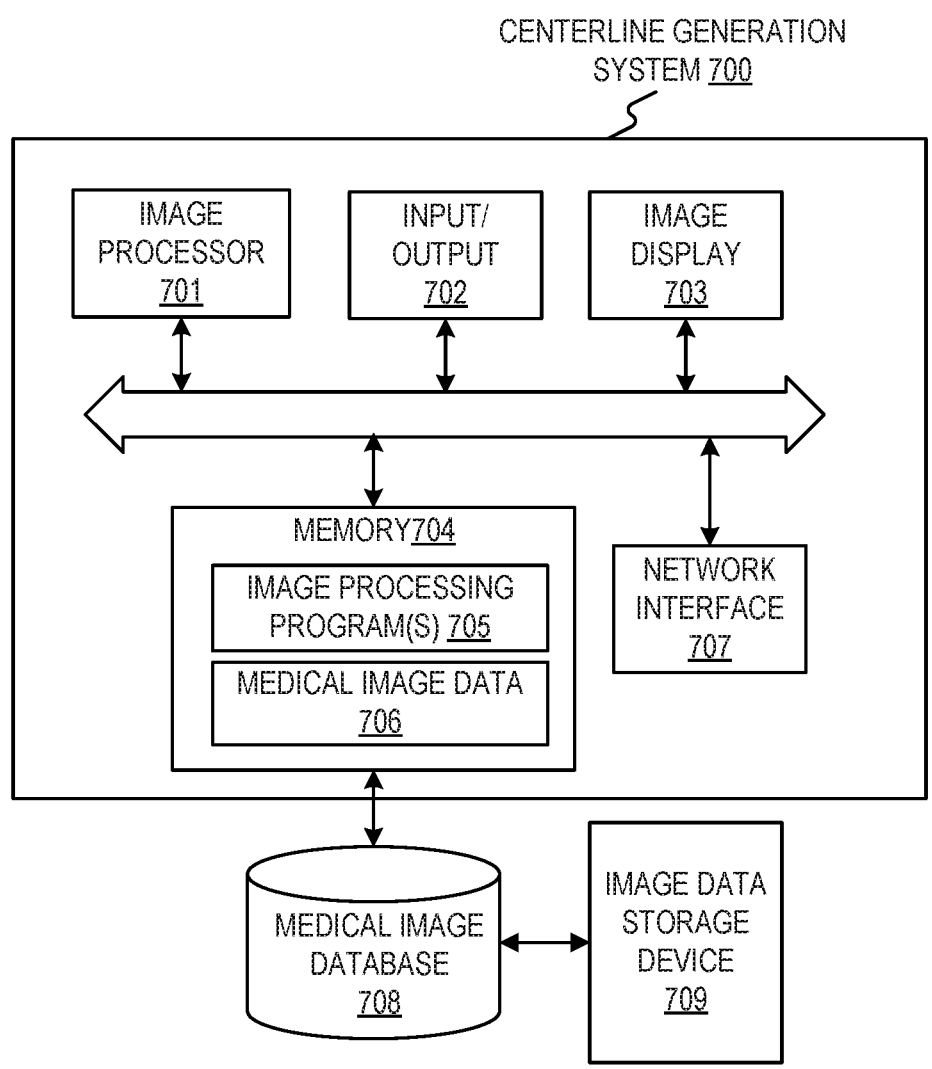
FIG. 7 depicts a block diagram illustrating an exemplary centerline generation system according to an embodiment of present disclosure.

FIG. 7 illustrates a block diagram of an exemplary centerline generation system 700 according to an embodiment of present disclosure. The centerline generation system 700 may include a network interface 707, by which the centerline generation system 700 (or the centerline generation device therein, which refers to the other components than the network interface 707) may be connected to the network (not shown), such as but not limited to the local area network in the hospital or the Internet. The network can connect the centerline generation system 700 with external devices such as an image acquisition device (not shown), medical image database 708, and an image data storage device 709. An image acquisition device may use any type of imaging modalities, such as but not limited to CT, digital subtraction angiography (DSA), MRI, functional MRI, dynamic contrast enhanced-MRI, diffusion MRI, spiral CT, cone beam computed tomography (CBCT), positron emission tomography (PET), single-photon emission computed tomography (SPECT), X-ray, optical tomography, fluorescence imaging, ultrasound imaging, radiotherapy portal imaging.

In some embodiments, the centerline generation system 700 may be a dedicated intelligent device or a general-purpose intelligent device. For example, the system 700 may adopt a computer customized for image data acquisition and image data processing tasks, or a server placed in the cloud. For example, the system 700 may be integrated into the image acquisition device.

The centerline generation system 700 may include an image processor 701 and a memory 704, and may additionally include at least one of an input/output 702 and an image display 703.

The image processor 701 may be a processing device that includes one or more general processing devices, such as a microprocessor, a central processing unit (CPU), a graphics processing unit (GPU), and the like. More specifically, the image processor 701 may be a complex instruction set computing (CISC) microprocessor, a reduced instruction set computing (RISC) microprocessor, a very long instruction word (VLIW) microprocessor, a processor running other instruction sets, or a processor that runs a combination of instruction sets. The image processor 701 may also be one or more dedicated processing devices such as application specific integrated circuits (ASICs), field programmable gate arrays (FPGAs), digital signal processors (DSPs), system-on-chip (SoCs), and the like. As would be appreciated by those skilled in the art, in some embodiments, the image processor 701 may be a special-purpose processor, rather than a general-purpose processor. The image processor 701 may include one or more known processing devices, such as a microprocessor from the Pentium™, Core™, Xeon™, or Itanium® family manufactured by Intel™, the Turion™, Athlon™, Sempron™, Opteron™ FX™, Phenom™ family manufactured by AMD™, or any of various processors manufactured by Sun Microsystems. The image processor 701 may also include graphical processing units such as a GPU from the GeForce®, Quadro®, Tesla® family manufactured by Nvidia™, GMA, Iris™ family manufactured by Intel™, or the Radeon™ family manufactured by AMD™. The image processor 701 may also include accelerated processing units such as the Desktop A-4 (6, 6) Series manufactured by AMD™, the Xeon Phi™ family manufactured by Intel™. The disclosed embodiments are not limited to any type of processor(s) or processor circuits otherwise configured to meet the computing demands of receiving, identifying, analyzing, maintaining, generating, and/or providing large amounts of imaging data or manipulating such imaging data to generate the centerline of the object by tracing a sequence of patches using trained first and second learning networks based on the input image. In addition, the term "processor" or "image processor" may include more than one processor, for example, a multi-core design or a plurality of processors each having a multi-core design. The image processor 701 can execute sequences of computer program instructions, stored in memory 704, to perform various operations, processes, methods disclosed herein.

The image processor 701 may be communicatively coupled to the memory 704 and configured to execute computer-executable instructions stored therein to perform the steps of method as described above. The memory 704 may include a read only memory (ROM), a flash memory, random access memory (RAM), a dynamic random-access memory (DRAM) such as synchronous DRAM (SDRAM) or Rambus DRAM, a static memory (for example, flash memory, static random access memory), or the like, on which computer executable instructions are stored in any format. In some embodiments, the memory 704 may store computer-executable instructions of one or more image processing program(s) 705. The computer program instructions can be accessed by the image processor 701, read from the ROM, or any other suitable memory location, and loaded in the RAM for execution by the image processor 701. For example, memory 704 may store one or more software applications. Software applications stored in the memory 704 may include, for example, an operating system (not shown) for common computer systems as well as for soft-controlled devices.

Further, memory 704 may store an entire software application or only a part of a software application (for example the image processing program(s) 705) to be executable by the image processor 701. In addition, the memory 704 may store a plurality of software modules, for implementing the respective steps of the method for generating a centerline for an object in an image or the process for training the learning network consistent with the present disclosure. For example, the encoder 201, 301, 401, the first learning network 202, 302, 402, and the second learning network 203, 303, 403 (as shown in FIGS. 2-4) may be implemented as soft modules stored on the memory 704.

Besides, the memory 704 may store data generated/buffered when a computer program is executed, for example, medical image data 706, including the medical images transmitted from image acquisition device(s), medical image database 708, image data storage device 709, or the like In some embodiments, medical image data 706 may include the image(s) received from the image acquisition devices to be treated by the image processing program(s) 705, and may include the medical image data generated during performing the method of generating the centerline of the object and/or training the learning network(s).

Besides, the image processor 701 may execute the image processing program(s) 705 to implement a method for generating centerline of the object. In this manner, each online centerline generation process may generate a piece of fresh training data to update the medical image data 706. The image processor 701 may train the first and second learning networks in an online manner to update the existing parameters (such as the weights) in the current learning network. In some embodiments, the updated parameters of the trained learning network may be stored in the medical image data 706, which may then be used in the next centerline generation for the same object of the same patient. Therefore, if the image processor 701 determines that the centerline generation system 700 has performed a centerline generation for the same object of the present patient, then the latest updated learning networks for centerline generation may be recalled and used directly.

In some embodiments, the image processor 701, upon performing an online centerline generation process, may associate the input image together with the automatically (or semi-automatically) generated centerline of the object as medical image data 706 for presenting and/or transmitting. In some embodiments, the input image together with the generated centerline may be displayed on the image display 703 for the user's review. In some embodiments, the medical image data by associating the input image with the generated centerlines may be transmitted to the medical image database 708, so as to be accessed, obtained, and utilized by other medical devices, if needed.

In some embodiments, the image data storage device 709 may be provided to exchange image data with the medical image database 708, and the memory 704 may communicate with the medical image database 708 to obtain the images of the current patient. For example, the image data storage device 709 may reside in other medical image acquisition devices, for example, a CT which performs scan on the patients. The slices of the patients on the object (such as vessel) may be transmitted, reconstructed into a volumetric image and saved into the medical image database 708, and the centerline generation system 700 may retrieve the volumetric image of the object from the medical image database 708 and generate centerline for the object in the volumetric image.

In some embodiments, the memory 704 may communicate with the medical image database 708 to transmit and save the input image associated with the generated centerline into the medical image database 708 as a piece of annotated training data with the ground truth, which may be used for training as described above.

For example, the image display 703 may be an LCD, a CRT, or an LED display.

The input/output 702 may be configured to allow the centerline generation system 700 to receive and/or send data. The input/output 702 may include one or more digital and/or analog communication devices that allow the system 700 to communicate with a user or other machine and device. For example, the input/output 702 may include a keyboard and a mouse that allow the user to provide an input.

In some embodiments, the image display 703 may present a user interface, so that the user, using the input/output 702 together with the user interface, may conveniently and intuitively correct (such as edit, move, modify, or the like) the automatically generated centerline of the object.

The network interface 707 may include a network adapter, a cable connector, a serial connector, a USB connector, a parallel connector, a high-speed data transmission adapter such as optical fiber, USB 6.0, lightning, a wireless network adapter such as a Wi-Fi adapter, a telecommunication (4G/LTE, 5G, 6G or beyond, or the like) adapters. The system 700 may be connected to the network through the network interface 707. The network may provide the functionality of local area network (LAN), a wireless network, a cloud computing environment (for example, software as a service, platform as a service, infrastructure as a service, or the like), a client-server, a wide area network (WAN), and the like using various communication protocols used presently or developed in the future.

Various operations or functions are described herein, which may be implemented as software code or instructions or defined as software code or instructions. Such content may be source code or differential code ("delta" or "patch"

code) that can be executed directly ("object" or "executable" form). The software code or instructions may be stored in computer readable storage medium, and when executed, may cause a machine to perform the described functions or operations and include any mechanism for storing information in the form accessible by a machine (for example, computing device, electronic system, or the like), such as recordable or non-recordable media (for example, read-only memory (ROM), random access memory (RAM), disk storage media, optical storage media, flash memory devices, or the like).

Exemplary methods described herein can be machine or computer-implemented at least in part. Some examples can include a non-transitory computer-readable medium or machine-readable medium encoded with instructions operable to configure an electronic device to perform methods as described in the above examples. An implementation of such methods can include software code, such as microcode, assembly language code, a higher-level language code, or the like. The various programs or program modules can be created using a variety of software programming techniques. For example, program sections or program modules can be designed in or using Java, Python, C, C++, assembly language, or any known programming languages. One or more of such software sections or modules can be integrated into a computer system and/or computer-readable media. Such software code can include computer readable instructions for performing various methods. The software code may form portions of computer program products or computer program modules. Further, in an example, the software code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (for example, compact disks and digital video disks), magnetic cassettes, memory cards or sticks, random access memories (RAMs), read only memories (ROMs), and the like.

Moreover, while illustrative embodiments have been described herein, the scope includes any and all embodiments having equivalent elements, modifications, omissions, combinations (for example, of aspects across various embodiments), adaptations or alterations based on the present disclosure. The elements in the claims are to be interpreted broadly based on the language employed in the claims and not limited to examples described in the present specification or during the prosecution of the application. Further, the steps of the disclosed methods can be modified in any manner, including by reordering steps or inserting or deleting steps. It is intended, therefore, that the descriptions be considered as examples only, with a true scope being indicated by the following claims and their full scope of equivalents.

What is claimed is:

1. A computer implemented method for generating a centerline for an object, comprising:
    receiving an image containing the object, wherein the image is acquired by an imaging device;
    generating the centerline of the object by tracing a sequence of patches with a virtual agent, by a processor, including, for each patch other than the initial patch:
        determining a current patch based on the position and action of the virtual agent at a previous patch;
        determining a policy function and a value function based on the current patch using a trained learning network, which comprises an encoder followed by a first learning network and a second learning network, wherein the learning network is trained by maximizing a cumulative reward and minimizing an auxiliary loss of detecting at least a bifurcation in a trajectory of the object, wherein at least one of the first learning network or the second learning network comprises a multi-layer perceptron layer or a recurrent neural network; and
        determining the action of the virtual agent at the current patch; and
    displaying the centerline of the object generated by the processor.

2. The method of claim 1, wherein, determining a policy function and a value function based on the current patch using a trained learning network comprises:
    determining a first vector by the encoder based on the current patch;
    determining a second vector by the first learning network based on the first vector; and
    determining the policy function and the value function based on a vector obtained by concatenating the first vector, the second vector and additional inputs, which comprises at least the reward of the previous patch and the action of the virtual agent at the previous patch, using the second learning network.

3. The method of claim 2, wherein the additional inputs further comprise a tracing velocity of the current patch.

4. The method of claim 2, wherein the reward of each patch combines a point-to-curve distance and the similarity of intensity between the current patch and the next patch, and the point-to-curve distance indicates the distance between the position of the current patch and the centerline of the object.

5. The method of claim 1, wherein the learning network is trained by additionally minimizing auxiliary losses of detecting an endpoint, and a loop closure.

6. The method of claim 1, wherein, a detection result of the bifurcation is output using a fully-connected layer at the end of the second learning network.

7. The method of claim 1, wherein the initial patch is preset and tracing a sequence of patches ends with a terminal state or a maximum episode length is reached.

8. The method of claim 1; wherein the image is a 3D image; and the action space of the virtual agent consists of six actions.

9. The method of claim 1, wherein the encoder is a convolutional neural network, and both the first learning network and the second learning network are recurrent neural network.

10. The method of claim 1, further comprising:
    performing, by the processor, quantitative measurements of the object based on the centerline; and
    outputting results of the quantitative measurements to a user interface.

11. A system for generating a centerline for an object, comprising:
    an interface configured to receive an image containing the object, wherein the image is acquired by an imaging device; and
    a processor configured to:
        generate the centerline of the object by tracing a sequence of patches with a virtual agent, including for each patch other than the initial patch:
            determine a current patch based on the position and action of the virtual agent at a previous patch;

determine a policy function and a value function based on the current patch using a trained learning network, which comprises an encoder followed by a first learning network and a second learning network, wherein the learning network is trained by maximizing a cumulative reward and minimizing an auxiliary loss of detecting at least a bifurcation in a trajectory of the object, wherein at least one of the first learning network or the second learning network comprises a multi-layer perceptron layer or a recurrent neural network; and determine the action of the virtual agent at the current patch; and a display configured to display the centerline of the object.

12. The system of claim 11, wherein the processor is further configured to train the learning network by additionally minimizing auxiliary losses of detecting an endpoint, and a loop closure.

13. The system of claim 11, wherein, the processor is further configured to:

determine a first vector by the encoder based on the current patch, determine a second vector by the first learning network based on the first vector, and output the policy function and the value function based on a vector obtained by concatenating the first vector, the second vector and additional inputs, which comprises at least the reward of the previous patch and the action of the virtual agent at the previous patch, using the second learning network.

14. The system of claim 13, wherein the additional inputs further comprise a tracing velocity of the virtual agent at the current patch.

15. The system of claim 13, wherein the reward of each patch combines a point-to-curve distance and the similarity of intensity between the current patch and the next patch, and the point-to-curve distance indicates the distance between the position of the current patch and the centerline of the object.

16. The system of claim 11, wherein, a detection result of the bifurcation is output using a fully-connected layer at the end of the second learning network.

17. The system of claim 11, wherein the initial patch is preset, and the processor is configured to end the tracing of a sequence of patches when a terminal state or a maximum episode length is reached.

18. The system of claim 11, wherein the image is a 3D image; and the action space of the virtual agent consists of six actions.

19. The system of claim 11, wherein the encoder is a convolutional neural network, and both the first learning network and the second learning network are recurrent neural network.

20. A non-transitory computer readable medium storing instructions that, when executed by a processor, perform a method for generating a centerline for an object, the method comprising:

receiving an image containing the object, wherein the image is acquired by an imaging device;

generating the centerline of the object by tracing a sequence of patches with a virtual agent, by the processor; including, for each patch other than the initial patch:

determining a current patch based on the position and action of the virtual agent at a previous patch;

determining a policy function and a value function based on the current patch using a trained learning network, which comprises an encoder followed by a first learning network and a second learning network, wherein the learning network is trained by maximizing a cumulative reward and minimizing an auxiliary loss of detecting at least a bifurcation in a trajectory of the object, wherein at least one of the first learning network or the second learning network comprises a multi-layer perceptron layer or a recurrent neural network; and determining the action of the virtual agent at the current patch; and outputting the centerline of the object for display.

* * * * *